United States Patent
Koyama et al.

(10) Patent No.: US 8,936,235 B2
(45) Date of Patent: Jan. 20, 2015

(54) FLUID-FILLED TYPE VIBRATION DAMPING DEVICE AND MANUFACTURING METHOD THEREOF

(75) Inventors: Hironori Koyama, Kasugai (JP); Mutsumi Muraoka, Nagakute (JP); Hironori Daito, Komaki (JP); Satoshi Umemura, Gifu (JP); Jyoji Tsutsumida, Komaki (JP); Shinichi Suganuma, Odawara (JP); Takeshi Hamanaka, Ebina (JP); Kaoru Murakami, Isehara (JP)

(73) Assignees: Sumitomo Riko Company Limited, Aichi (JP); Nissan Motor Co., Ltd., Kanagawa (JP)

( * ) Notice: Subject to any disclaimer, the term of this patent is extended or adjusted under 35 U.S.C. 154(b) by 205 days.

(21) Appl. No.: 13/415,049

(22) Filed: Mar. 8, 2012

(65) Prior Publication Data
US 2012/0242021 A1 Sep. 27, 2012

(30) Foreign Application Priority Data

Mar. 25, 2011 (JP) ................................. 2011-067092
Feb. 21, 2012 (JP) ................................. 2012-035215

(51) Int. Cl.
*F16F 13/28* (2006.01)
*F16F 13/16* (2006.01)
*F16F 13/10* (2006.01)

(52) U.S. Cl.
CPC .................................... *F16F 13/103* (2013.01)
USPC .................................................. 267/140.14

(58) Field of Classification Search
CPC ......... F16F 9/3484; F16F 9/348; F16F 9/341; F16F 9/3485; F16F 9/3405; F16F 13/08; F16F 13/10; F16F 13/30; F16F 13/26; F16F 13/105; F16F 13/106; F16F 13/262; F16F 13/264; F16F 13/268
USPC ................. 267/140.14, 140.13, 141.1–141.4, 267/140.11, 140.4, 141.7, 118; 29/506, 29/508, 521; 188/314, 282.6, 297
See application file for complete search history.

(56) References Cited

U.S. PATENT DOCUMENTS 1,678,640 A * 7/1928 Hall ............................ 285/382.2
5,080,332 A * 1/1992 Yoda et al. ................ 267/140.12

(Continued)

FOREIGN PATENT DOCUMENTS

EP 1111267 6/2001
JP 06-307572 11/1994

(Continued)

OTHER PUBLICATIONS

Search report from E.P.O. mail date is Jun. 21, 2012.

*Primary Examiner* — Anna Momper
*Assistant Examiner* — San Aung
(74) *Attorney, Agent, or Firm* — Greenblum & Bernstein, P.L.C.

(57) ABSTRACT

A fluid-filled type vibration damping device including a base component and a tubular mating component. The tubular mating component is externally fitted onto the base component by means of a diameter-constricting caulking with a sealing rubber clasped therebetween so as to constitute a mate-fastened portion. The tubular mating component extends axially outward beyond a sealed section of the mate-fastened portion so as to provide a caulking tube portion. A diametrical position of the tubular mating component at the sealed section is determined by contact of the caulking tube portion against an outside peripheral face of a positioning projection provided on the base component so as to define a diametrical positioning portion. The caulking tube portion is constricted in diameter and held in engagement with an axial edge portion of the positioning projection so as to form an axial positioning portion.

9 Claims, 9 Drawing Sheets

(56) References Cited

U.S. PATENT DOCUMENTS

| | | |
|---|---|---|
| 2001/0052664 A1 | 12/2001 | Saitoh |
| 2005/0001402 A1* | 1/2005 | Beck ..................... 280/124.159 |
| 2007/0222128 A1* | 9/2007 | Ichikawa et al. ......... 267/140.14 |
| 2008/0284075 A1 | 11/2008 | Saito et al. |
| 2010/0192766 A1* | 8/2010 | Minoguchi et al. ............. 92/168 |
| 2012/0091643 A1 | 4/2012 | Matsuda |

FOREIGN PATENT DOCUMENTS

| | | |
|---|---|---|
| JP | 2005-233242 | 9/2005 |
| JP | 2005-273682 | 10/2005 |
| JP | 2005-273791 | 10/2005 |
| JP | 2008-138854 | 6/2008 |
| JP | 2010-249188 | 11/2010 |

* cited by examiner

FLUID-FILLED TYPE VIBRATION DAMPING DEVICE AND MANUFACTURING METHOD THEREOF

INCORPORATED BY REFERENCE

The disclosure of Japanese Patent Application No. 2011-067092 filed on Mar. 25, 2011 and No. 2012-035215 filed on Feb. 21, 2012, each including the specification, drawings and abstract are incorporated herein by reference in their entirety.

BACKGROUND OF THE INVENTION

1. Field of the Invention

The present invention relates generally to a vibration damping device used for an automotive engine mount or the like, and particularly to a fluid-filled type vibration damping device that utilizes vibration damping effect based on the flow behavior of the fluid sealed in the fluid chamber, and to a method for manufacturing such a device.

2. Description of the Related Art

There have been known fluid-filled type vibration damping devices including a fluid chamber filled with a non-compressible fluid and capable of attaining vibration damping effect by utilizing flow behavior of the fluid induced during input of vibration. In the fluid-filled type vibration damping device, a first mounting member and a second mounting member are elastically connected by a main rubber elastic body, and the main rubber elastic body partially defines a wall of the fluid chamber, in order to apply vibration to the fluid chamber. Also, in recent years, with the aim of realizing more enhanced vibration damping characteristics, proposed is an active type fluid-filled vibration damping device furnished with an electromagnetic actuator and able to actively control pressure in the fluid chamber (see Japanese Unexamined Patent Publication No. JP-A-2005-273682).

The fluid-filled vibration damping device of this type employs a structure in which the second mounting member is divided into a base component of metal and a tubular mating component of metal, and the tubular mating component is externally fitted onto the outer circumferential face of the base component by means of a diameter-constricting caulking with a sealing rubber clasped therebetween, making it possible to seal the non-compressible fluid or attach the electromagnetic actuator. With this structure, the sealing rubber is interposed at the mate-fastened portion and caulked by the diameter constriction, thereby ensuring fluidtightness of the fluid chamber and to prevent dust from coming into the interior of the electromagnetic actuator.

However, the sealing rubber clasped at the mate-fastened portion posed a problem of difficulty in controlling a level of the diameter constriction during the diameter-constricting caulking. For example, an excessive deformation on the sealing rubber poses a risk of adverse effect on its durability. On the other hand, a poor compression on the sealing rubber poses a risk of insufficient sealing performance. In addition, due to variability in the level of the diameter constriction, there is also a risk that accuracy of coaxiality or parallelism of the base component and the tubular mating component may deteriorate.

In particular, with respect to the active type fluid-filled vibration damping device, a higher degree of accuracy of coaxiality or parallelism and durability of the device is required in order to efficiently transmit oscillation force at the connecting section of the base component and the tubular mating component which provides a support portion of the electromagnetic actuator. Accordingly, more enhanced dimensional accuracy, fastening strength, as well as durability at the mate-fastened portion have been desired, while at the same time ensuring its sealing performance.

SUMMARY OF THE INVENTION

It is therefore one object of the present invention to provide a fluid-filled type vibration damping device of novel construction which is able to ensure sealing performance at the mate-fastened portion of the base component and the tubular mating component, while being capable of improving accuracy of coaxiality and parallelism of those base component and the tubular mating component, as well as a method for manufacturing the same.

Specifically, a first mode of the present invention provides a fluid-filled type vibration damping device including: a first mounting member; a second mounting member including a base component and a tubular mating component; a main rubber elastic body connecting the first mounting member and the second mounting member; a fluid chamber filled with a non-compressible fluid and adapted to receive input of vibration; a mate-fastened portion constituted by externally fitting the tubular mating component onto an outer circumferential face of the base component by means of a diameter-constricting caulking with a sealing rubber clasped therebetween; a caulking tube portion that is provided at a portion of the tubular mating component extending outward in an axial direction beyond a sealed section of the mate-fastened portion sealed by the sealing rubber; and at least one positioning projection provided on the base component at a section where the caulking tube portion is externally fitted, wherein a diametrical position of the tubular mating component at the sealed section is determined by contact of the caulking tube portion against an outside peripheral face of the positioning projection so as to define a diametrical positioning portion; and wherein the caulking tube portion is constricted in diameter and held in engagement with at least one axial edge portion of the positioning projection so as to form an axial positioning portion.

The fluid-filled type vibration damping device according to the above first mode includes the mate-fastened portion of the base component and the tubular mating component having a structure in which the sealed section sealed by the sealing rubber and the caulking tube portion caulked by the diameter constriction are provided separately from each other. With this arrangement, it is possible to respectively set suitable levels of diameter-constricting deformation to the sealed section and the caulking tube portion of the tubular mating component. Accordingly, on the one hand, the sealed section will be sufficiently compressed but the sealing rubber is kept from being damaged, thereby ensuring durability as well as avoiding entry of debris such as dusts. On the other hand, the caulking tube portion will obtain a sufficient fastening strength of the base component and the tubular mating component.

Besides, as described above, the sealed section and the caulking tube portion are separated from each other, so that the base component (the positioning projection) and the tubular mating component (the caulking tube portion) can be pressed against each other at the caulking tube portion. Therefore, even if the shape of the caulking tube portion recovers to a certain degree due to spring back after the diameter-constricting deformation of the caulking tube portion, the caulking tube portion is sufficiently firmly pressed against the positioning projection. Thus, positioning action in the diametrical and axial directions will be effectively achieved.

Moreover, the base component and the caulking tube portion of the tubular mating component are both rigid components, and are pressed against each other directly without interposing an elastic body such as rubber. Accordingly, the base component and the tubular mating component are positioned with high accuracy in the diametrical and axial directions. Furthermore, the base component and the tubular mating component will be prevented from playing or the like due to sinkage of the rubber etc., whereby positioning accuracy can be maintained for a long period of time.

A second mode of the present invention provides the fluid-filled type vibration damping device according to the first mode, further including: an electromagnetic actuator including a stator furnished with a coil supported by the second mounting member, and a movable member capable of relative displacement in the axial direction with respect to the stator; and an oscillation member which is connected to the movable member and partially defines a wall of the fluid chamber so that oscillation force of the oscillation member is adapted to be exerted to the fluid chamber, wherein the base component comprises a housing fitting provided to the stator of the electromagnetic actuator; and wherein the tubular mating component is externally fitted onto the housing fitting by means of the diameter-constricting caulking.

According to the second mode, the fluid-filled type active vibration damping device that requires high accuracy especially in coaxiality and parallelism of the vibration damping device main unit and the electromagnetic actuator is able to realize efficient transmission of the oscillation force, since the tubular mating component and the housing fitting of the electromagnetic actuator that constitute a vibration damping device main unit are positioned with high accuracy.

Additionally, during the diameter-constricting process, the outside peripheral face of the positioning projection and the inner circumferential face of the caulking tube portion come into contact with each other, whereby the diametrical position (the diameter after the diameter-constricting caulking) of the sealed section is determined and the level of compression of the sealing rubber is suitably established. Consequently, excellent sealing performance will be achieved, thereby avoiding deterioration of active vibration damping effect, malfunction of the electromagnetic actuator, or the like due to entry of debris into the housing fitting.

A third mode of the present invention provides the fluid-filled type vibration damping device according to the first or second mode wherein the axial edge portion of the positioning projection comprises an axial outer edge portion; and wherein the axial positioning portion of the caulking tube portion includes an axial detent part that is held in engagement with the axial outer edge portion.

According to the third mode, the positioning projection includes the axial edge portion provided at its axially outer side. The caulking tube portion is held in engagement with the axial outer edge portion so as to define the axial detent part. By so doing, the axial detent part will prevent dislodgement (separation) between the tubular mating component and the base component that tends to be a problem particularly in connecting the tubular mating component and the base component.

A fourth mode of the present invention provides the fluid-filled type vibration damping device according to any one of the first through third modes wherein the axial edge portion of the positioning projection comprises an axial inner edge portion; and wherein the axial positioning portion of the caulking tube portion includes an axial insertion stopper part that is held in engagement with the axial inner edge portion.

According to the fourth mode, the positioning projection includes the axial edge portion provided at its axially inner side. The caulking tube portion is held in engagement with the axial inner edge portion so as to define the axial insertion stopper part. By so doing, the axial insertion stopper part will prevent relative displacement of the tubular mating component and the base component in the pushing direction.

A fifth mode of the present invention provides the fluid-filled type vibration damping device according to any one of the first through fourth modes wherein the at least one positioning projection comprises a plurality of positioning projections formed separately in the axial direction so that the at least one axial edge portion of the positioning projections adjacent to each other comprise axial opposite edge portions; and wherein the axial positioning portion of the caulking tube portion includes an axial detent/axial insertion stopper part that is inserted between the positioning projections and is held in engagement with the axial opposite edge portions.

According to the fifth mode, the axial edge portion is provided at each of the axially opposite sides of the positioning projections adjacent to each other. The caulking tube portion is held in engagement with the axial opposite edge portions so as to define the axial detent/axial insertion stopper part. By so doing, the axial detent part is able to prevent relative displacement of the tubular mating component and the base component in the dislodging direction, while the axial insertion stopper part is able to prevent relative displacement of the tubular mating component and the base component in the pushing direction. Thus, the tubular mating component and the base component will be positioned to the prescribed relative position in the axial direction.

Moreover, the caulking tube portion is constricted diametrically inwardly between the axially opposite positioning projections adjacent to each other and held in engagement with the axial opposite edge portions of the positioning projections adjacent to each other so as to be positioned at the axially both directions. Therefore, executing the diameter-constricting process to a single location of the caulking tube portion enables positioning in the axially both directions.

Furthermore, by contact of the caulking tube portion against the outside peripheral face of the plurality of positioning projections, a plurality of the diametrical positioning portions are provided at locations separated from each other in the axial direction. Accordingly, it is possible to establish the level of compression of the sealing rubber with higher accuracy, as well as to effectively position the tubular mating component and the base component in the diametrical direction, thereby especially preventing relative tilt of the tubular mating component and the base component.

A sixth mode of the present invention provides the fluid-filled type vibration damping device according to any one of the first through fifth modes wherein the axial edge portion is of an angular shape having an angle between 90 and 100 degrees.

According to the sixth mode, the axial edge portion of angular shape having the angle between 90 and 100 degrees becomes wedged into the caulking tube portion, thereby effectively exhibiting the resistance to the relative displacement in the axial direction (namely, the positioning action) of the tubular mating component and the base component at the axial positioning portion.

A seventh mode of the present invention provides a method of manufacturing the fluid-filled type vibration damping device according to any one of the first through sixth modes, comprising the following steps of: externally fitting the tubular mating component onto the base component; and subjecting the tubular mating component to a diameter-constricting process at the sealed section sealed by the sealing rubber and the caulking tube portion simultaneously so that the diametrical position of the tubular mating component at the sealed section is determined by contact of the caulking tube portion against the outside peripheral face of the positioning projection so as to define the diametrical positioning portion, wherein during the diameter-constricting process to the tubular mating component, a level of diameter-constricting deformation is made greater in a section of the caulking tube portion situated away from the positioning projection rather than a section of the caulking tube portion externally fitted onto the positioning projection so as to form the axial positioning portion.

According to the method of manufacturing the fluid-filled type vibration damping device of the seventh mode, the diametrical position (the diameter after the diameter-constricting caulking) of the tubular mating component at the sealed section is determined by contact of the caulking tube portion against the outside peripheral face of the positioning projection. Meanwhile, the level of diameter-constricting deformation of the caulking tube portion is made greater in the section situated away from the positioning projection rather than the section of the caulking tube portion externally fitted onto the positioning projection. With this arrangement, the positioning action in the diametrical direction as well as the resistance to dislodgement and pushing in the axial direction will be effectively obtained without damaging the sealing rubber.

Moreover, the sealed section and caulking tube portion are subjected to the diameter-constricting process simultaneously. This will avoid increase in the number of manufacturing processes, making it easy to manufacture the fluid-filled type vibration damping device of construction according to the present invention.

In preferred practice, the original shape of the sealed section and the caulking tube portion of the tubular mating component prior to the diameter-constricting process are of a round tubular shape having the same inside and outside diameter dimensions. Besides, in preferred practice, when the tubular mating component is externally fitted onto the base component and is subjected to the diameter-constricting process, the level of diameter-constricting deformation is set equally to the sealed section and the section externally fitted onto the positioning projection. By so doing, the level of diameter-constricting deformation of the sealed section is determined by that of the section externally fitted onto the positioning projection, thereby adjusting the level of compression of the sealing rubber with excellent accuracy. As a result, sealing failure due to lack of level of diameter-constricting deformation, damage to the sealing rubber due to excess of level of diameter-constricting deformation, or the like will be prevented.

According to the present invention, the caulking tube portion of the tubular mating component that extends outward in the axial direction beyond the sealed section is fastened by means of a diameter-constricting caulking to the positioning projection of the base component. Consequently, the tubular mating component and the base component come into contact with each other and are positioned without interposing a rubber or the like, so as to be positioned with high accuracy. Besides, the positioning accuracy will be stably maintained. Furthermore, the diametrical position of the sealed section is determined by contact of the outside peripheral face of the positioning projection and the inner circumferential face of the caulking tube portion. Therefore, it is possible to establish the level of compression of the sealing rubber to an extent such that the sealing rubber is kept from being damaged but effective sealing performance can be exhibited, thereby obtaining both excellent durability and sealing performance.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
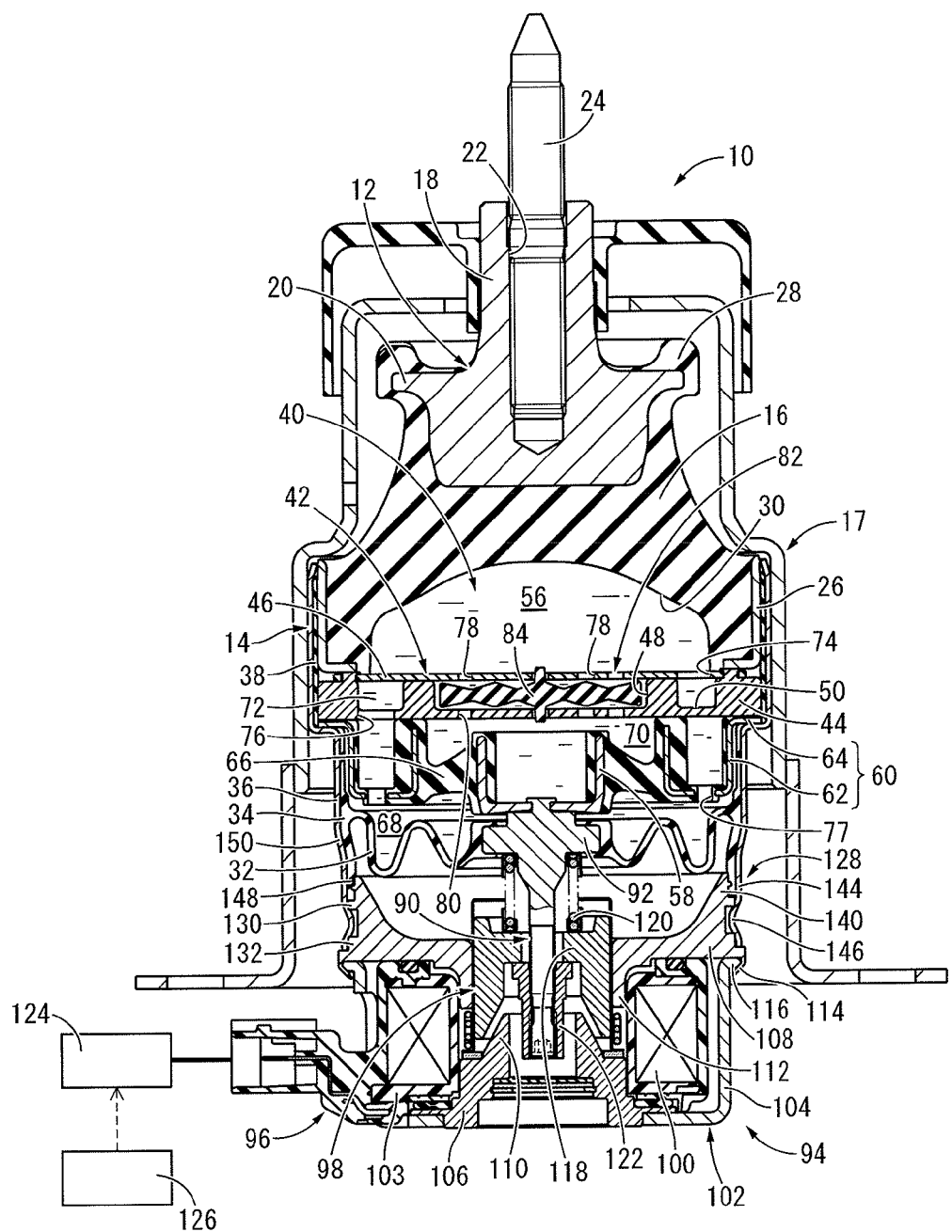
FIG. 1 is an elevational view in axial or vertical cross section of a fluid-filled type vibration damping device in the form of an engine mount, which is constructed according to a first embodiment of the present invention.

Referring first to FIG. 1, there is depicted an automotive engine mount 10 according to a first embodiment of a fluid-filled type vibration damping device constructed in accordance with the present invention. The engine mount 10 has a construction in which a first mounting member 12 and a second mounting member 14 are elastically connected by a main rubber elastic body 16. By the first mounting member 12 being attached to a power unit (not shown) and the second mounting member 14 being attached to a vehicle body (not shown) via an outer bracket 17 fitted externally onto the second mounting member 14, the engine mount 10 provides vibration damping linkage of the power unit on the vehicle body. In the description hereinbelow, as a general rule, the vertical direction refers to the vertical direction in FIG. 1.

Described more specifically, first mounting member 12 is a high rigidity component made of a metallic material or the like, and is integrally equipped with a main portion 18 and a flange portion 20. The main portion 18 is of generally stepped circular post shape whose upper part has a smaller diameter, and a flange portion 20 projects peripherally outward from the stepped portion of the main portion 18. In addition, the main portion 18 includes a screw hole 22 that opens onto its upper face and extends along the center axis. An implanted bolt 24 is threaded onto the screw hole 22.

Meanwhile, the second mounting member 14 includes an intermediate sleeve 26. The intermediate sleeve 26 is of thin-walled, large-diameter, generally round tubular shape, and its lower end projects diametrically inward so as to have an inner flanged shape. Besides, the intermediate sleeve 26 is a high rigidity component made of a metallic material or the like similar to the first mounting member 12.

The first mounting member 12 and the intermediate sleeve 26 are arranged in a concentric fashion, spaced apart in the diametrical and axial direction, and elastically interconnected by the main rubber elastic body 16. The main rubber elastic body 16 is of thick-walled, large-diameter, generally frusto-conical shape. To the small-diameter end part of the main rubber elastic body 16 the main portion 18 of the first mounting member 12 is bonded by vulcanization, while to the outer circumferential face of the large-diameter end part of the main rubber elastic body 16 the inner circumferential face of the intermediate sleeve 26 is juxtaposed and bonded by vulcanization.

A stopper rubber 28 is integrally formed with the main rubber elastic body 16. The stopper rubber 28 extends from the small-diameter end part of the main rubber elastic body 16 and is bonded so as to cover the outer circumferential face and the upper face of the flange portion 20 of the first mounting member 12. Accordingly, the stopper rubber 28 projects upward from the upper face of the flange portion 20 so as to be axially opposed to the top wall of the outer bracket 17.

A center recess 30 opens onto the large-diameter end part of the main rubber elastic body 16. The center recess 30 has an inverted, generally bowl shape or a generally cylindrical shape that opens downward.

A flexible film 32 is attached to the intermediate sleeve 26. The flexible film 32 is a rubber film having a thin, generally disk shape or generally dome shape with an ample slack in the vertical direction. In addition, the flexible film 32 includes an anchor portion 34 of generally cylindrical shape integrally formed at its outer peripheral edge. The anchor portion 34 is bonded by vulcanization to a tubular mating component 36 of metal. The tubular mating component 36 has a stepped, generally round tubular shape, and to the inner circumferential face of its small-diameter portion situated at the lower side the anchor portion 34 is bonded by vulcanization. On the other hand, the large-diameter portion of the tubular mating component 36 situated at the upper side is externally fitted onto the intermediate sleeve 26 and then subjected to a diameter-constricting process, thereby being mated around the intermediate sleeve 26. In this way, the tubular mating component 36 is externally fastened onto the intermediate sleeve 26 and included as a part of the second mounting member 14. With this arrangement, the flexible film 32 is attached to the second mounting member 14 and expands in the axis-perpendicular direction so as to partition the second mounting member 14 in the vertical direction. Note that the inner circumferential face of the large-diameter portion of the tubular mating component 36 is covered by a seal rubber layer 38 formed of a thin-walled rubber elastic body, so that the intermediate sleeve 26 and the tubular mating component 36 are fluid-tightly attached to each other via the seal rubber layer 38.

With the flexible film 32 attached to the second mounting member 14 in this way, a fluid-filled zone 40 sealed off from the outside is formed between opposed faces of the main rubber elastic body 16 and the flexible film 32, and is filled with a non-compressible fluid. While no particular limitation is imposed as to the non-compressible fluid filling the fluid-filled zone 40, preferred examples are water, alkylene glycols, polyalkylene glycols, silicone oil, and mixtures of these. In terms of efficiently achieving vibration damping action based on flow action of the fluid described later, a low-viscosity fluid having viscosity of 0.1 Pa·s or lower is especially preferred.

A partition member 42 is disposed within the fluid-filled zone 40. The partition member 42 is a generally circular disk shape component and includes a partition member body 44 and a cover member 46. The partition member body 44 is of thick-walled, generally circular disk shape, and has a housing recess 48 of cylindrical shape that opens upward in its center section. A slot 50 opening upward is formed in the outside peripheral portion of the partition member body 44, and extends just short of once about the circumference.

Meanwhile, the cover member 46 has a thin-walled, circular disk shape having smaller diameter than that of the partition member body 44, and is superposed against the upper face of the partition member body 44 and secured thereto. By attaching the cover member 46 to the partition member body 44, the opening of the housing recess 48 is covered with the cover member 46 so as to form a housing space, while the opening of the slot 50 is covered with the cover member 46 so as to form a tunnel-like passage. The partition member body 44 and the cover member 46 is secured to each other in the following way: a swage projection that projects upward from the partition member body 44 is inserted through a swage hole passing through the cover member 46, then undergoes diameter expansion at its upper end portion, and is detained to the opening rim of the swage hole.

Then, the outer peripheral edge of the partition member body 44 is clasped between the axially opposed faces of the intermediate sleeve 26 and the riser portion of the tubular mating component 36, so that the partition member 42 is supported by the second mounting member 14 and extends in the axis-perpendicular direction within the fluid-filled zone 40. In this way, the partition member 42 divides the fluid-filled zone 40 into upper and lower parts, and the upper part defines a pressure-receiving chamber 56 whose wall is partially defined by the main rubber elastic body 16.

An oscillation member 58 is disposed between the partition member 42 and the flexible film 32 axially opposed to each other. The oscillation member 58 is a metal member of small-diameter, generally cup shape or generally round tubular shape with a bottom, and is disposed on the center axis of the engine mount 10.

Besides, an annular support member 60 is disposed to the outer peripheral side of the oscillation member 58. The support member 60 is integrally equipped with an annular groove 62 that extends annularly in the circumferential direction and a support flange 64 of annular disk shape that projects outward from the upper end of the outside peripheral wall of the annular groove 62. The annular groove 62 of the support member 60 has the inside diameter dimension larger than the outside diameter dimension of the oscillation member 58. Accordingly, the inside peripheral wall of the annular groove 62 is positioned diametrically outside the peripheral wall of the oscillation member 58 so as to be spaced apart therefrom.

Moreover, a support rubber elastic body 66 is disposed between the oscillation member 58 and the support member 60. The support rubber elastic body 66 has a generally annular disk shape and become progressively thicker towards its inner peripheral side. The inner peripheral edge of the support rubber elastic body 66 is bonded by vulcanization to the peripheral wall of the oscillation member 58, while the outer peripheral edge bonded by vulcanization to the inside peripheral wall of the annular groove 62 of the support member 60. With this arrangement, the oscillation member 58 and the support member 60 are elastically connected by the support rubber elastic body 66. Note that the inner peripheral edge of the support rubber elastic body 66 is bonded to both inside and outside faces of the peripheral wall of the oscillation member 58, while the outer peripheral edge of the support rubber elastic body 66 bonded to both inside and outside faces of the inside peripheral wall of the annular groove 62. Thus, the support rubber elastic body 66 takes the form of an integrally vulcanization molded component incorporating the oscillation member 58 and the support member 60.

The integrally vulcanization molded component of the support rubber elastic body 66 constructed as above is supported by the second mounting member 14 by means of the support flange 64 of the support member 60 being clasped between the partition member body 44 and the riser portion of the tubular mating component 36 over the entire circumference. With this arrangement, the integrally vulcanization molded component of the support rubber elastic body 66 divides the lower part of the fluid-filled zone 40, which is formed between the partition member 42 and the flexible film 32 axially opposed to each other, into upper and lower parts. Accordingly, an equilibrium chamber 68 whose wall is partially defined by the flexible film 32 is formed between the flexible film 32 and the integrally vulcanization molded component of the support rubber elastic body 66. Meanwhile, an intermediate chamber 70 whose wall is partially defined by the oscillation member 58 is formed between the partition member 42 and the oscillation member 58 with the support rubber elastic body 66. Needless to say, a non-compressible fluid is sealed in all of the pressure-receiving chamber 56, the equilibrium chamber 68, and the intermediate chamber 70. Besides, in the present embodiment, the pressure-receiving chamber 56 and the intermediate chamber 70 constitute a fluid chamber.

In addition, the pressure-receiving chamber 56 and the equilibrium chamber 68 are interconnected via an orifice passage 72. The orifice passage 72 is provided in the partition member 42 and includes the tunnel-like passage utilizing the slot 50 so that the pressure-receiving chamber 56 and the interior of the annular groove 62, which partially defines the equilibrium chamber 68, are held in communication. Specifically, one end of the above tunnel-like passage communicates with the pressure-receiving chamber 56 via an upper communication hole 74 formed in the cover member 46, while the other end communicates with the equilibrium chamber 68 via a lower communication hole 76 formed in the partition member body 44, thereby providing the orifice passage 72 that produces fluid flow between the pressure-receiving chamber 56 and the equilibrium chamber 68. The orifice passage 72 is tuned to low frequency on the order of 10 Hz that corresponds to an engine shake. The interior of the annular groove 62 communicates with the equilibrium chamber 68 via a plurality of passage holes 77 formed in the base wall part of the annular groove 62, thereby substantially constituting a part of the equilibrium chamber 68.

Additionally, the pressure-receiving chamber 56 and the intermediate chamber 70 are held in communication with each other through a plurality of lower through holes 80 formed in the partition member body 44, the housing recess 48, and a plurality of upper through holes 78 formed in the cover member 46. Accordingly, the upper and lower through holes 78, 80 and the housing recess 48 provide a filter orifice 82 serving as a pressure transmission passage, so that the pressure of the intermediate chamber 70 is adapted to be transmitted to the pressure-receiving chamber 56 via the filter orifice 82. The filter orifice 82 is tuned to high frequency on the order of 120 Hz that corresponds to a driving rumble or the like, namely, to higher frequency than the tuning frequency of the orifice passage 72.

Moreover, a movable rubber plate 84 is disposed within the housing recess 48. The movable rubber plate 84 is formed of a rubber elastic body of generally circular disk shape, and includes thick portions and thin portions alternately provided in the diametrical direction. Besides, the movable rubber plate 84 includes a spindle portion jutting out in the axial opposite directions. The partition member body 44 and the cover member 46 each have a positioning hole passing through the diametrical center thereof, and the spindle portion of the movable rubber plate 84 is inserted into each of the positioning holes. With this arrangement, the movable rubber plate 84 is disposed within the housing recess 48. Note that the movable rubber plate 84 is positioned with respect to the partition member 42 in the diametrical direction, while being permitted tiny displacement in the axial direction.

The movable rubber plate 84 extends outwardly beyond the area where the upper and lower through holes 78, 80 are formed, and lies on the fluid path of the filter orifice 82. During input of low-frequency, large-amplitude vibration such as the engine shake, the movable rubber plate 84 is restrained by the partition member 42, and the filter orifice 82 is blocked by the movable rubber plate 84, thereby limiting the amount of fluid flow through the filter orifice 82. By so doing, pressure fluctuations of the pressure-receiving chamber 56 relative to the equilibrium chamber 68 will effectively be induced, thereby efficiently producing fluid flow through the orifice passage 72. Therefore, vibration damping effect on the basis of the flow action of the fluid will be effectively exhibited. On the other hand, during input of midrange- to high-frequency, small-amplitude vibration such as the driving rumble, owing to tiny displacement of the movable rubber plate 84, the filter orifice 82 opens and permits fluid flow. Accordingly, oscillation force of an electromagnetic actuator 94 (described later) will be transmitted to the pressure-receiving chamber 56, thereby attaining active vibration damping effect.

Furthermore, the oscillation member 58 includes an output shaft 90 attached thereto. The output shaft 90 has a small-diameter rod shape extending in the vertical direction overall, and includes a swage projection integrally formed with the upper end portion of the output shaft 90. The swage projection is inserted into a swage hole passing through the base wall part of the oscillation member 58 and undergoes diameter expansion deformation, whereby the upper end portion of the output shaft 90 is secured to the base wall part of the oscillation member 58.

The output shaft 90 includes an anchor flange 92 of annular disk shape that is integrally formed to the axially medial section of the output shaft 90 and projects diametrically outward. The anchor flange 92 is bonded by vulcanization to the center section of the flexible film 32. With this arrangement, the output shaft 90 penetrates the flexible film 32 in the vertical direction and is fluid-tightly anchored to the flexible film 32, so that fluidtightness of the fluid-filled zone 40 is ensured.

Meanwhile, the lower end portion of the output shaft 90 is attached to the electromagnetic actuator 94. The electromagnetic actuator 94 includes a stator 96 furnished with a coil 100, and a movable member 98 capable of oscillating displacement in the vertical direction with respect to the stator 96.

The stator 96 has a structure in which a yoke fitting 102 is attached around the coil 100 of cylindrical shape. Note that an insulating component 103 formed of an electrically insulative synthetic resin material is provided between the coil 100 and the yoke fitting 102, so that the periphery of the coil 100 is covered by the insulating component 103.

The yoke fitting 102 is formed of a ferromagnetic metal material and constructed by combining: an outside peripheral yoke fitting 104 of round tubular shape with a bottom that has a circular passage hole in the center of its base wall; an inside peripheral yoke fitting 106 of generally annular shape that is fitted into the passage hole of the outside peripheral yoke fitting 104; and an upper yoke fitting 108 of generally annular disk shape that is attached to the upper opening of the outside peripheral yoke fitting 104. There are formed magnetic gaps between the inner peripheral upper end of the inside peripheral yoke fitting 106 and the inner peripheral lower end of the upper yoke fitting 108 which are separated from each other, so that the inner peripheral edges of the yoke fittings 106, 108 serve as magnetic pole portions 110, 112 that provide a magnetic pole through energization of the coil 100.

A caulking piece 114 is integrally formed with the lower outer peripheral edge of the upper yoke fitting 108 and extends downward. Meanwhile, a caulking portion 116 of flanged shape is provided to the upper end of the outside peripheral yoke fitting 104. The caulking piece 114 is detained by caulking against the caulking portion 116, whereby the upper yoke fitting 108 and the outside peripheral yoke fitting 104 are fastened together. In the present embodiment, the yoke fitting 102 including the upper yoke fitting 108 constitutes a housing fitting, and the housing fitting constitutes a base component.

The movable member 98 is disposed in the center section of the stator 96. The movable member 98 is a component formed of a ferromagnet and having a generally cylindrical shape. An inner flanged portion 118 is integrally formed with the upper end portion of the movable member 98 and projects inward. The movable member 98 is inserted into the center hole of the upper yoke fitting 108 while being in opposition to the inner peripheral edge of the inside peripheral yoke fitting 106 in the axial direction. When the coil 100 is energized and a magnetic pole is provided to the inner peripheral edge of the inside peripheral yoke fitting 106 (the magnetic pole portion 110), attractive force toward the inside peripheral yoke fitting 106 will be exerted on the movable member 98. Accordingly, the movable member 98 undergoes displacement axially downward.

The movable member 98 of the electromagnetic actuator 94 constructed in the above manner is attached to the output shaft 90. Specifically, the portion of the output shaft 90 that extends downward from the flexible film 32 is inserted into the center hole of the movable member 98, and a coil spring 120 is interposed between the anchor flange 92 and the upper face of the movable member 98. Meanwhile, a detent nut 122 is threaded onto a bolt thread portion provided to the lower end portion of the output shaft 90 and comes into contact with the inner flanged portion 118 of the movable member 98 from below. By so doing, the output shaft 90 and the movable member 98 are elastically positioned and interconnected. As will be apparent from the above description, relative displacement between the upper end portion of the output shaft 90 and the movable member 98 in the direction of axial separation is limited by the detent nut 122, while relative displacement therebetween in the direction of axial approach is permitted by deformation of the coil spring 120.

With the movable member 98 connected to the output shaft 90, when the coil 100 is energized by the power supply 124 outside and axially downward force is exerted on the movable member 98, the output shaft 90 connected to the movable member 98 undergoes displacement downward, so that the oscillation member 58 fastened to the upper end of the output shaft 90 undergoes displacement downward. Then, when energization of the coil 100 by the power supply 124 is ceased, the support rubber elastic body 66, which has been subjected to elastic deformation due to displacement of the oscillation member 58, will exhibit recovery force based on its elasticity, whereby the oscillation member 58, and the output shaft 90 and the movable member 98 connected to the oscillation member 58 will be restored to their original position. Therefore, by controlling energization of the coil 100 by the power supply 124 by utilizing a control means 126, the oscillation member 58 is oscillated in the vertical direction by the electromagnetic actuator 94, thereby applying a prescribed oscillation force to the intermediate chamber 70. Controlling of the energization of the coil 100 by the control means 126 can be realized through map control, feedback control, or the like.

It should be appreciated that the yoke fitting 102 of the electromagnetic actuator 94 partially constitutes the second mounting member 14, so that the coil 100 of the electromagnetic actuator 94 is supported by the second mounting member 14. Specifically, the lower end portion of the tubular mating component 36 is externally fitted onto the upper yoke fitting 108 of the electromagnetic actuator 94 by means of a diameter-constricting caulking with a sealing rubber 148 (described later) clasped therebetween, thereby constituting a mate-fastened portion 128. In this way, the yoke fitting 102 of the electromagnetic actuator 94 partially constitutes the second mounting member 14. The connecting construction between the tubular mating component 36 and the upper yoke fitting 108 will be described below.

Figure 2:
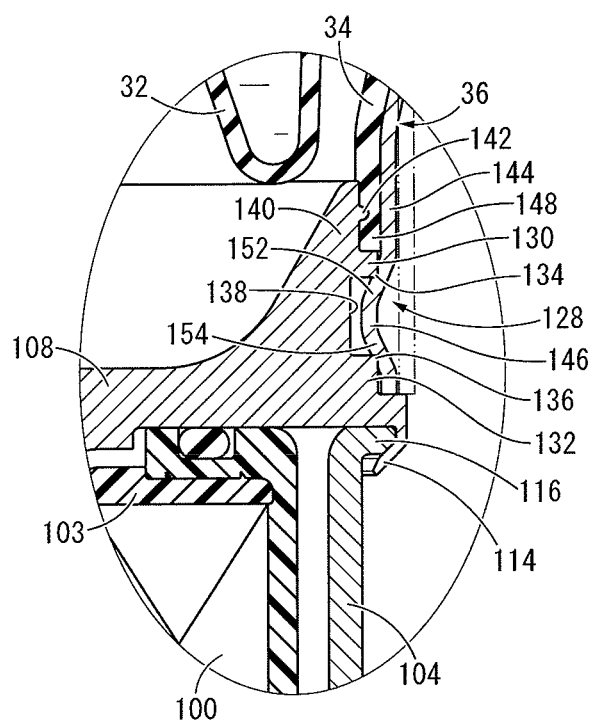
FIG. 2 is a fragmentary enlarged view of a principle part of the engine mount of FIG. 1.

As depicted in FIG. 2, the outside peripheral portion of the upper yoke fitting 108 projects upward, so that the upper yoke fitting 108 becomes progressively thicker towards diametrically outward. On the outer circumferential face of the upper yoke fitting 108, there is formed an upper positioning projection 130 that projects diametrically outward. In addition, a lower positioning projection 132 that projects diametrically outward is formed in a section spaced away axially downward from the upper positioning projection 130 by a prescribed distance. It should be noted that the upper positioning projection 130 and the lower positioning projection 132 have the same projecting height, so that their projecting distal end faces (outside peripheral faces) have a cylindrical face of the same diameter.

Moreover, the outside peripheral lower edge of the upper positioning projection 130 constitutes an axial outer edge portion 134 of annular shape, while the outside peripheral upper edge of the lower positioning projection 132 constitutes an axial inner edge portion 136 of annular shape. In preferred practice, the axial edge portions 134, 136 are of angular shape having the angle not less than 90 degrees and not more than 100 degrees. In the present embodiment, both the axial edge portions 134, 136 have the angle approximately 90 degrees. Here, the angle of the axial outer edge portion 134 refers to the angle formed by the outside peripheral face and the lower end face of the upper positioning projection 130 in axial or vertical cross section; and the angle of the axial inner edge portion 136 refers to the angle formed by the outside peripheral face and the upper end face of the lower positioning projection 132 in axial or vertical cross section. Note that the axial outer edge portion 134 and the axial inner edge portion 136 may have the angles different from each other.

Since the upper positioning projection 130 and the lower positioning projection 132 that project peripherally outward are formed separately in the axial direction, there is provided an annular recessed groove 138 opening peripherally outward between the axially opposite upper positioning projection 130 and lower positioning projection 132. That is, the axial edge portions 134, 136 of the upper positioning projection 130 and the lower positioning projection 132 are defined by the opening edges of this annular recessed groove 138. In other words, the axial edge portions 134, 136 in the present embodiment constitute axial opposite edge portions of a plurality of the positioning projections 130, 132 adjacent to each other.

Furthermore, an annular sealing portion 140 is integrally formed with the upper yoke fitting 108. The annular sealing portion 140 protrudes axially above the upper positioning projection 130. The outside peripheral face of the annular sealing portion 140 is of generally cylindrical face having a diameter larger than that of the bottom wall (the outside peripheral face) of the annular recessed groove 138, and smaller than that of the positioning projections 130, 132. Additionally, in the axially medial section of the annular sealing portion 140, there is integrally formed a seal rib 142 that projects diametrically outward. The seal rib 142 extends about the entire circumference with a generally semicircular cross section that progressively becomes narrower towards its projecting distal end. Besides, the projecting height of the seal rib 142 is smaller than that of the upper positioning projection 130.

On the other hand, the tubular mating component 36 includes at the lower end of its small-diameter section a sealed section 144 and a caulking tube portion 146 that extends outward in the axial direction (namely, downward) beyond the sealed section 144, which are integrally formed. Before a diameter-constricting process to be described later, the sealed section 144 and the caulking tube portion 146 are of round tubular shape having approximately the same diameter. A sealing rubber 148 formed by utilizing the lower end portion of the anchor portion 34 of the flexible film 32 is anchored to the inner circumferential face of the sealed section 144, while the caulking tube portion 146 is positioned below and away from the anchor portion 34. The inside diameter dimension of the sealed section 144 and the caulking tube portion 146 prior to the diameter-constricting process is made greater than the outside diameter dimension of the upper yoke fitting 108 where the upper positioning projection 130 and the lower positioning projection 132 are formed. As will be apparent from the above description, the sealing rubber 148 is integrally formed with the flexible film 32 with the aim of decreasing the number of parts or manufacturing processes.

The sealed section 144 of the tubular mating component 36 is externally fitted onto the annular sealing portion 140 of the upper yoke fitting 108, so that the sealing rubber 148 is interposed diametrically between the sealed section 144 and the annular sealing portion 140. Furthermore, the caulking tube portion 146 of the tubular mating component 36 is externally fitted onto the upper yoke fitting 108 and extends so as to straddle the annular recessed groove 138, and hence is externally fitted onto the upper positioning projection 130 and the lower positioning projection 132.

In this way, the sealed section 144 and the caulking tube portion 146 of the tubular mating component 36 are externally fitted onto the upper yoke fitting 108, and then the sealed section 144 and the caulking tube portion 146 are subjected to a diameter-constricting process such as 360-degree radial compression, thereby simultaneously realizing sealing and diameter-constricting caulking to the mate-fastened portion 128 of the tubular mating component 36 and the upper yoke fitting 108. The diameter-constricting process is executed on the lower end of the small-diameter section of the tubular mating component 36, so that a sloping portion 150 is formed in the medial section of the tubular mating component 36. Accordingly, the lower side of the sloping portion 150 is smaller in diameter than the upper side of the sloping portion 150. In FIG. 2, the tubular mating component 36 prior to the diameter-constricting process is indicated by the chain double-dashed line.

Specifically, by constricting diametrically the sealed section 144 of the tubular mating component 36, the sealing rubber 148 is clasped between the sealed section 144 and the annular sealing portion 140 of the upper yoke fitting 108, thereby providing sealing particularly at the section where the seal rib 142 is formed. At this time, the diametrical position (the diameter after the diameter-constricting caulking) of the sealed section 144 is determined by contact of the caulking tube portion 146 against the outside peripheral face of the upper positioning projection 130, so as to define a diametrical positioning portion. In the present embodiment, the lower end of the sealing rubber 148 is positioned in abutment with the upper face of the upper positioning projection 130. This will limit elastic deformation of the sealing rubber 148, thereby exhibiting effective sealing performance.

In addition, by constricting diametrically the caulking tube portion 146 of the tubular mating component 36, the caulking tube portion 146 of the tubular mating component 36 is fastened by means of a diameter-constricting caulking to the upper yoke fitting 108, so that the tubular mating component 36 and the upper yoke fitting 108 are connected and relatively positioned in the diametrical and axial directions.

In specific terms, the portion of the caulking tube portion 146 that straddles the annular recessed groove 138 is constricted diametrically more inwardly than the portion of the caulking tube portion 146 that is externally fitted onto the upper positioning projection 130 and the lower positioning projection 132, so as to be pushed into the annular recessed groove 138. With this arrangement, the axially opposite sides of the portion of the caulking tube portion 146 that is pushed into the annular recessed groove 138 constitute upper and lower tapered portions 152, 154 that incline with respect to the axial direction. The axial outer edge portion 134 is pressed against the upper tapered portion 152, and the axial inner edge portion 136 is pressed against the lower tapered portion 154. By so doing, the tubular mating component 36 and the upper yoke fitting 108 are diametrically positioned so as to be arranged in a concentric fashion. It should be appreciated that the tubular mating component 36 and the upper yoke fitting 108 may be diametrically positioned by contact of the caulking tube portion 146 against either the outside peripheral face of the upper positioning projection 130 or the outside peripheral face of the lower positioning projection 132.

The axial outer edge portion 134 is pressed against the upper tapered portion 152 of the caulking tube portion 146, while the axial inner edge portion 136 is pressed against the lower tapered portion 154 of the caulking tube portion 146, whereby the axial edge portions 134, 136 are each wedged into the caulking tube portion 146 and held in engagement therewith. Accordingly, engagement of the axial outer edge portion 134 with the upper tapered portion 152 provides an axial detent part that prevents the upper yoke fitting 108 from becoming dislodged in the downward direction with respect to the tubular mating component 36. On the other hand, engagement of the axial inner edge portion 136 with the lower tapered portion 154 provides an axial insertion stopper part that prevents the upper yoke fitting 108 from being pushed in the upward direction with respect to the tubular mating component 36. In the present embodiment, the axial detent part and the axial insertion stopper part constitute an axial positioning portion that relatively positions the tubular mating component 36 and the upper yoke fitting 108 in the axial direction.

Figure 3:
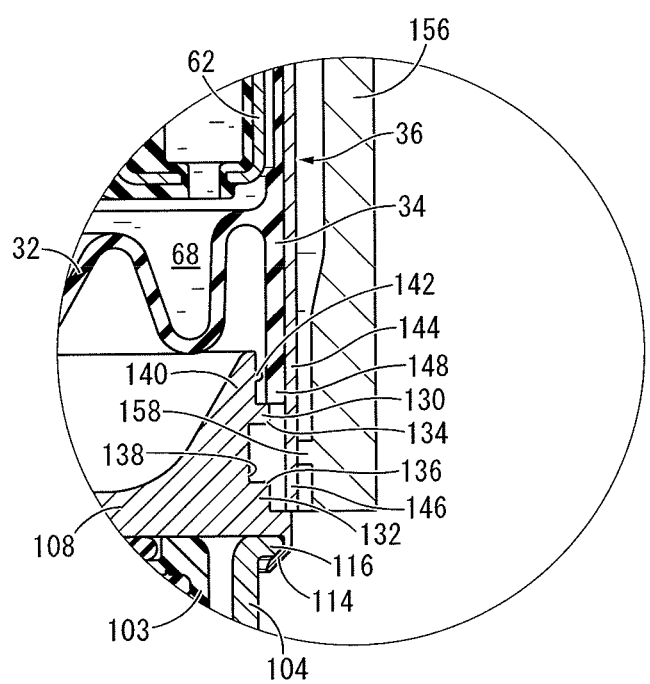
FIG. 3 is a fragmentary enlarged view in axial or vertical cross section of a principle part of the engine mount of FIG. 1, showing a state before a tubular mating component is fastened by means of a diameter-constricting caulking to an upper yoke fitting.

The above-described sealing and positioning of the tubular mating component 36 by means of the diameter-constricting deformation thereof are simultaneously realized through a single diameter-constricting process. Specifically, for example, as shown in FIG. 3, when manufacturing the engine mount 10, first, a jig 156 for subjecting the tubular mating component 36 to a diameter-constricting process is prepared. The jig 156 has a pushing protrusion 158 that projects inward at a location corresponding to the annular recessed groove 138 of the upper yoke fitting 108. Next, the tubular mating component 36 is externally fitted onto the upper yoke fitting 108, and the jig 156 is externally fitted onto the tubular mating component 36. Then, the jig 156 is pressed from the outer peripheral side simultaneously against the sealed section 144 and the caulking tube portion 146 of the tubular mating component 36, which has a round tubular shape, so that the sealed section 144 and the caulking tube portion 146 are simultaneously subjected to a diameter-constricting process. By so doing, a level of diameter-constricting deformation of the tubular mating component 36 is made greater in the section externally fitted between the axially opposite upper and lower positioning projections 130, 132 against which the pushing protrusion 158 of the jig 156 is pressed rather than the sealed section 144 and the section externally fitted onto the upper and lower positioning projections 130, 132. Therefore, by adjusting the projecting height of the pushing protrusion 158 of the jig 156, it is possible to appropriately establish the each level of diameter-constricting deformation of: the sealed section 144; the section of the caulking tube portion 146 externally fitted onto the positioning projections 130, 132; and the section of the caulking tube portion 146 situated away from the positioning projections 130, 132, through a single diameter-constricting process. As will be apparent from FIG. 3, in the present embodiment, the level of diameter-constricting deformation of the sealed section 144 and the level of diameter-constricting deformation of the section of the caulking tube portion 146 externally fitted onto the positioning projections 130, 132 are approximately equal to each other.

Besides, the sealed section 144 and the caulking tube portion 146 of the tubular mating component 36 undergo spring back (recovery of shape based on elasticity of the caulking tube portion 146) after the diameter-constricting process. Thus, the level of the diameter constriction during the caulking process of each site of the tubular mating component 36 is established in consideration of the spring back. Specifically, even after the spring back caused by the elasticity etc. of the tubular mating component 36, the sealing rubber 148 is sufficiently compressed, and seal between the tubular mating component 36 and the upper yoke fitting 108 is ensured. In addition, the inner circumferential face of the caulking tube portion 146 that extends outward in the axial direction beyond the upper positioning projection 130 is inserted diametrically inwardly beyond the outside peripheral faces of the upper and lower positioning projections 130, 132, and engagement of the upper and lower positioning projections 130, 132 with the axial edge portions 134, 136 is ensured. Note that the thickness dimension of the sealing rubber 148 is made greater than the dimension that is the sum of the projecting height of the upper positioning projection 130 (the projecting height from the outer circumferential face of the annular sealing portion 140) plus the amount of spring back of the sealed section 144. Accordingly, even if the sealed section 144 undergoes spring back after the diameter-constricting process, effective sealing performance will be obtained.

In the present embodiment, as depicted in FIG. 3, the vertical dimension of the pushing protrusion 158 of the jig 156 is made smaller than the vertical dimension (the width dimension) of the annular recessed groove 138 of the upper yoke fitting 108 in order to reliably maintain engagement of the caulking tube portion 146 with the axial edge portions 134, 136 after the spring back of the caulking tube portion 146. With this arrangement, during the diameter-constricting process of the caulking tube portion 146, the pushing protrusion 158 is sufficiently pushed into the annular recessed groove 138 without interference with the upper and lower positioning projections 130, 132. Thus, engagement of the caulking tube portion 146 with the axial edge portions 134, 136 will be maintained even after the spring back. In preferred practice, when viewed in axis-perpendicular direction projection, there is provided a gap whose dimension is equal to or greater than the thickness dimension of the tubular mating component 36 between the pushing protrusion 158 and each of the upper and lower positioning projections 130, 132. Additionally, it is desirable that the upper and lower faces of the pushing protrusion 158 be a flat surface that extends in the axis-perpendicular direction which coincides with the moving direction of the jig 156 during the diameter-constricting process. This will prevent interference of the pushing protrusion 158 with the upper and lower positioning projections 130, 132.

The engine mount 10 of this construction according to the present embodiment is able to ensure sealing performance in the connecting section of the tubular mating component 36 and the upper yoke fitting 108, owing to the sealing rubber 148 being clasped between the sealed section 144 of the tubular mating component 36 and the annular sealing portion 140 of the upper yoke fitting 108. At the same time, the caulking tube portion 146 of the tubular mating component 36 is held in contact against the upper and lower positioning projections 130, 132 of the upper yoke fitting 108, so that the tubular mating component 36 and the upper yoke fitting 108 are relatively positioned. In this way, the mate-fastened portion 128 of the tubular mating component 36 and the upper yoke fitting 108 comprises the section sealed by the sealing rubber 148 and the section connected by the caulking tube portion 146 that are separately provided in the axial direction. Accordingly, it is possible to set different levels of diameter-constricting deformation to the sealed section 144 and caulking tube portion 146. Therefore, the mate-fastened portion 128 will obtain, on the one hand, excellent sealing performance and durability thereof by the sealing rubber 148 being sufficiently compressed but kept from being damaged, and on the other hand, sufficient fastening strength by the caulking tube portion 146 being firmly pressed against the upper and lower positioning projections 130, 132.

Moreover, the caulking tube portion 146 of the tubular mating component 36 and the upper and lower positioning projections 130, 132 of the upper yoke fitting 108 are held in contact against each other directly without interposing an elastic body such as rubber. Thus, positioning action by the contact makes it possible to establish coaxiality or parallelism with high accuracy. Therefore, the oscillation force of the electromagnetic actuator 94 will be efficiently transmitted to the oscillation member 58, thereby attaining desired active vibration damping effect. Furthermore, since the positioning action is provided by components that are both formed of a metallic material, the initial positioning action will stably exhibit for a long period of time. Consequently, the engine mount 10 is less likely to suffer from deterioration of transmission efficiency of the oscillation force due to time course, so that desired vibration damping ability will be maintained.

Additionally, the caulking tube portion 146 is subjected to an appreciable diameter-constricting process between the axially opposite axial outer edge portion 134 of the upper positioning projection 130 and the axial inner edge portion 136 of the lower positioning projection 132, and pressed against each of the axial edge portions 134, 136. This arrangement will prevent the upper yoke fitting 108 from both becoming dislodged and being pushed with respect to the tubular mating component 36. That is, the diameter constriction at a single location enables positioning of the tubular mating component 36 and the upper yoke fitting 108 in the axially both directions. Moreover, both the axial outer edge portion 134 and the axial inner edge portion 136 are of angular shape having the angle of approximately 90 degrees. Thus, the axial edge portions 134, 136 will become wedged into the inner circumferential face of the caulking tube portion 146 like a wedge, exhibiting firm detaining force. Accordingly, it is possible to efficiently obtain resistance to dislodgement and pushing in the axial direction, whereby the tubular mating component 36 and the upper yoke fitting 108 will be axially positioned.

Furthermore, since the axial outer edge portion 134 of the upper positioning projection 130 and the axial inner edge portion 136 of the lower positioning projection 132 are each held in contact against the inner circumferential face of the caulking tube portion 146 directly without interposing an rubber or the like, tubular mating component 36 and the upper yoke fitting 108 are positioned in the diametrical direction. In particular, the sections where the upper and lower positioning projections 130, 132 and the caulking tube portion 146 are held in contact are provided so as to be spaced away from each other by a prescribed distance in the axial direction. Thus, positioning in the diametrical direction is realized with high accuracy, and the tubular mating component 36 and the upper yoke fitting 108 are prevented from relative tilt. Consequently, relative tilt of the output shaft 90 and the oscillation member 58 will also be prevented. As a result, the output shaft 90 and the oscillation member 58 can be positioned with excellent accuracy at their connecting section (the upper end of the output shaft 90), so as to be readily connected without exerting unnecessary initial strain on the support rubber elastic body 66.

Figure 4:
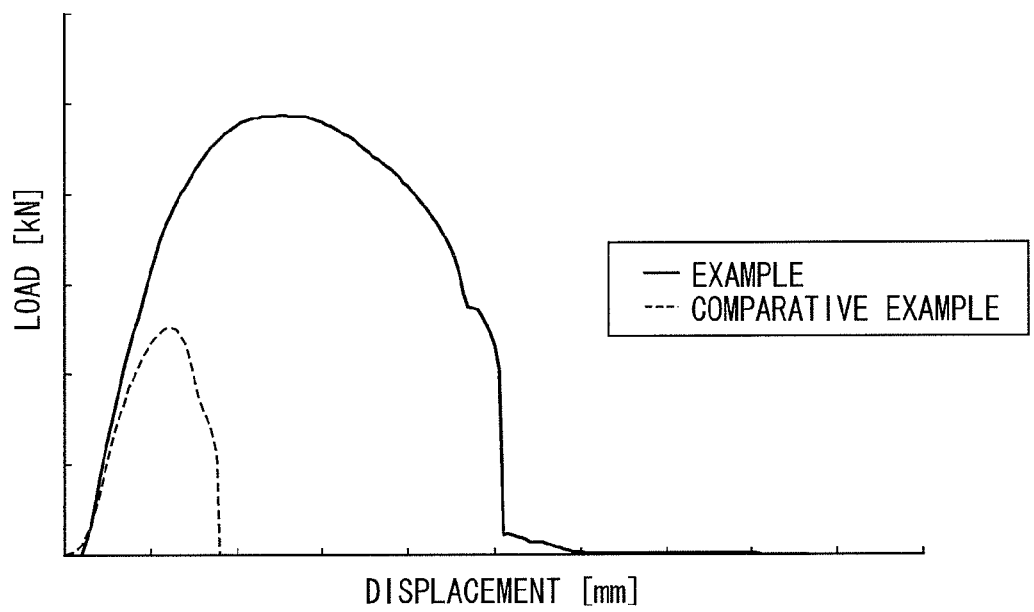
FIG. 4 is a graph showing resistance to dislodgement of the upper yoke fitting from the tubular mating component.

It will be apparent from the graph in FIG. 4 showing measurements of resistance to dislodgement through tests that the engine mount 10 of construction according to the present embodiment exhibits greater resistance to dislodgement at the mate-fastened portion 128 of the tubular mating component 36 and the upper yoke fitting 108 in comparison with an engine mount of conventional construction. Specifically, the graph in FIG. 4 indicates by the solid line as Example the resistance to dislodgement exhibited by the mate-fastened portion 128 of construction according to the present embodiment, while indicating by the dashed line as Comparative Example the resistance to dislodgement exhibited by the conventional connecting construction in which a tubular mating component and an upper yoke fitting are detained by caulking against each other via a sealing rubber. It was confirmed from these results that Example having the connecting construction of the present invention (the construction of the mate-fastened portion 128) exhibits resistance to dislodgement approximately twice that of Comparative Example having the conventional connecting construction. In this way, it is clear from the test results that the engine mount 10 is able to effectively exhibit resistance to dislodgement of the tubular mating component 36 and the upper yoke fitting 108.

Figure 5:
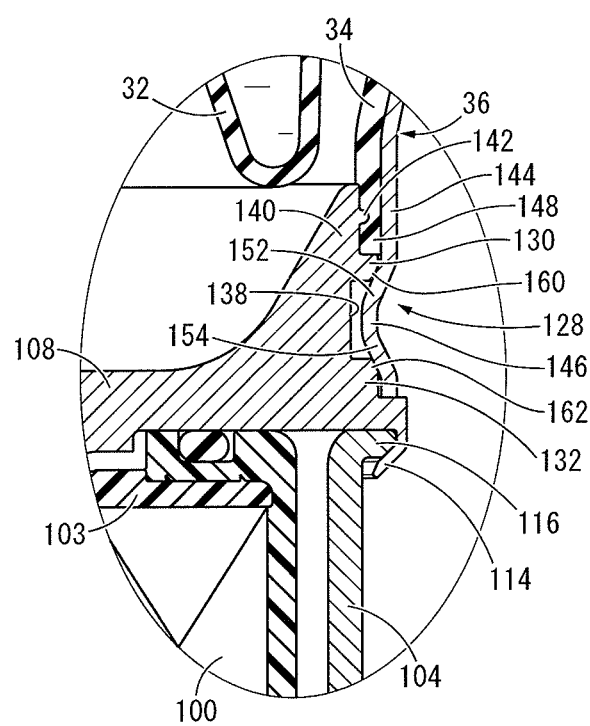
FIG. 5 is a fragmentary enlarged view in axial or vertical cross section of a principle part of an engine mount according to a second embodiment of the present invention.

Next, FIG. 5 depicts a principle part of an automotive engine mount according to a second embodiment of a fluid-filled type vibration damping device constructed in accordance with the present invention. In the following description, components and parts that are substantially identical with those in the preceding first embodiment will be assigned like symbols and not described in any detail. Also, in the following description, the other parts than what is depicted are substantially identical with those of the engine mount 10 in the first embodiment and therefore will not be discussed in detail.

The upper yoke fitting 108 of this engine mount includes an axial outer edge portion 160 of the upper positioning projection 130 and an axial inner edge portion 162 of the lower positioning projection 132. The axial edge portions 160, 162 have a structure in which the axial edge portions 134, 136 in the preceding first embodiment are chamfered. After the diameter-constricting process of the caulking tube portion 146, the axial edge portions 160, 162 are held in planar contact against the inside peripheral face of the upper and lower tapered portions 152, 154 of the caulking tube portion 146. The axial outer edge portion 160 is chamfered by the slope angle approximately equal to that of the upper tapered portion 152, while the axial inner edge portion 162 is chamfered by the slope angle approximately equal to that of the lower tapered portion 154.

With the engine mount of this construction according to the present embodiment, the axial edge portions 160, 162 are chamfered so that the caulking tube portion 146 of the tubular mating component 36 and the the positioning projections 130, 132 of the upper yoke fitting 108 come into planar contact against each other. Accordingly, the tubular mating component 36 and the upper yoke fitting 108 are stably positioned in the diametrical and axial directions.

Besides, since the caulking tube portion 146 and the positioning projections 130, 132 are held in planar contact against each other, the stress concentration on the contact sections will be ameliorated, thereby improving durability or the like.

Figure 6:
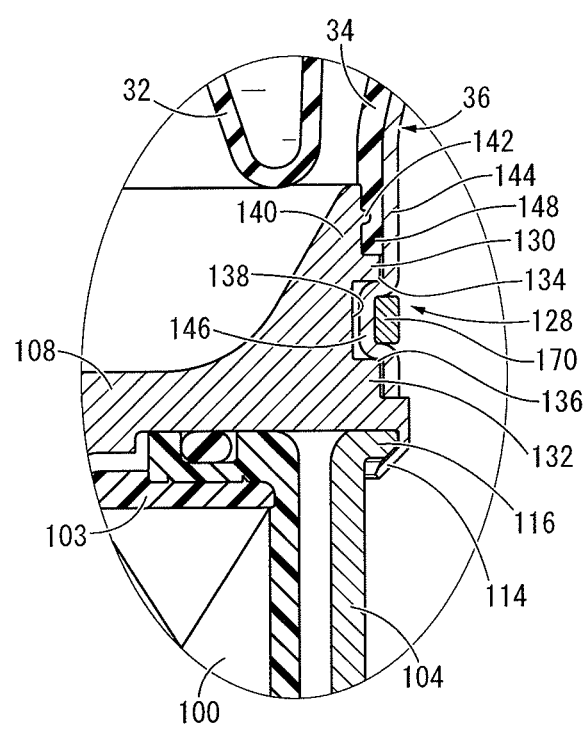
FIG. 6 is a fragmentary enlarged view in axial or vertical cross section of a principle part of an engine mount according to a third embodiment of the present invention.

Referring next to FIG. 6, there is depicted a principle part of an automotive engine mount according to a third embodiment of a fluid-filled type vibration damping device constructed in accordance with the present invention.

This engine mount has a structure in which a ring fitting 170 is fitted externally onto the caulking tube portion 146 of the tubular mating component 36 and fitted between the axially opposite upper positioning projection 130 and the lower positioning projection 132 (namely, into the annular recessed groove 138) of the upper yoke fitting 108. The ring fitting 170 may have an annular shape, or alternatively a C-letter shape when viewed in the axial direction. The ring fitting 170 is externally fitted onto the caulking tube portion 146, and then is subjected to a diameter-constricting process, thereby being inserted into the annular recessed groove 138. When viewed in axial direction projection, the ring fitting 170 partially overlaps the upper and lower positioning projections 130, 132.

With this arrangement, the ring fitting 170 and the upper and lower positioning projections 130, 132 are held in engagement in the axial direction via the caulking tube portion 146. Thus, the tubular mating component 36 and the upper yoke fitting 108 are able to achieve even greater resistance to dislodgement and pushing in the axial direction, and are more positioned in the axial direction.

Figure 7:
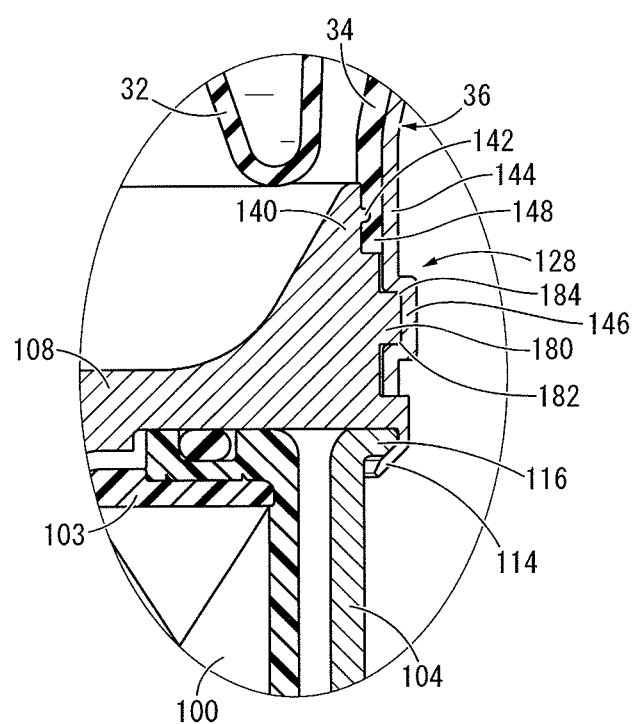
FIG. 7 is a fragmentary enlarged view in axial or vertical cross section of a principle part of an engine mount according to a fourth embodiment of the present invention.

Referring next to FIG. 7, there is depicted a principle part of an automotive engine mount according to a fourth embodiment of a fluid-filled type vibration damping device constructed in accordance with the present invention.

This engine mount includes a single positioning projection 180 that is formed on the outer circumferential face of the upper yoke fitting 108 and projects diametrically outward about the entire circumference. The positioning projection 180 is provided in the axially medial section of the outer circumferential face of the upper yoke fitting 108. The projecting distal end (the outside peripheral end) of the positioning projection 180 includes an axial outer edge portion 182 of annular shape at its lower end edge, and an axial inner edge portion 184 of annular shape at its upper end edge. Note that the sections of the outer circumferential face of the upper yoke fitting 108 situated away from the annular sealing portion 140 and the positioning projection 180 have a cylindrical face with a diameter smaller than that of the positioning projection 180 and larger than that of the annular sealing portion 140, and the opposite sections of the positioning projection 180 have approximately the same diameter.

The caulking tube portion 146 of the tubular mating component 36 is externally fitted onto the upper yoke fitting 108, and then subjected to a diameter-constricting process so as to be pressed against the positioning projection 180. Described more specifically, the caulking tube portion 146 is constricted diametrically more inwardly in the section situated axially away from the positioning projection 180 rather than in the section externally fitted onto the positioning projection 180. With this arrangement, the outside peripheral face of the positioning projection 180 comes into contact against the caulking tube portion 146, so that the diametrical position (the diameter after the diameter-constricting caulking) of the sealed section 144 is determined, and a diametrical positioning portion is provided for positioning the tubular mating component 36 and the upper yoke fitting 108 in the diametrical direction. Besides, the axial edge portions 182, 184 of the positioning projection 180 come into contact against the caulking tube portion 146, so as to form the axial detent part and the axial insertion stopper part for positioning the tubular mating component 36 and the upper yoke fitting 108 in the axial direction.

By so doing, the single positioning projection 180 is able to limit relative displacement of the tubular mating component 36 and the upper yoke fitting 108 in the axially opposite sides, thereby effectively exhibiting resistance to dislodgement and pushing between the tubular mating component 36 and the upper yoke fitting 108.

Additionally, the outside peripheral face of the positioning projection 180 and the inner circumferential face of the caulking tube portion 146 are held in contact over a large surface area. Thus, even the single positioning projection 180 will more effectively position the tubular mating component 36 and the upper yoke fitting 108 in the diametrical direction, as well as more effectively prevent relative tilt of the tubular mating component 36 and the upper yoke fitting 108. It should be appreciated that by providing a plurality of positioning projections 180 that are formed separately in the axial direction, the positioning action in the diametrical direction will be more effectively achieved, while effectively preventing relative tilt of the tubular mating component 36 and the upper yoke fitting 108.

Figure 8:
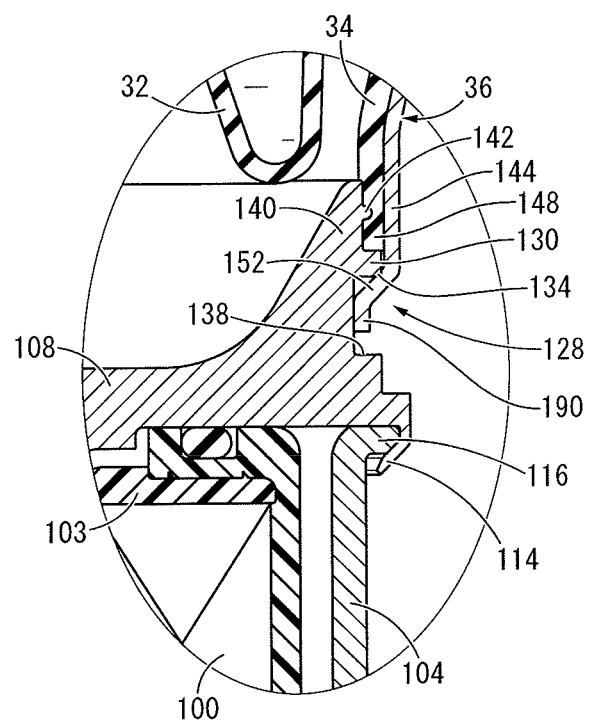
FIG. 8 is a fragmentary enlarged view in axial or vertical cross section of a principle part of an engine mount according to a fifth embodiment of the present invention.

Referring next to FIG. 8, there is depicted a principle part of an automotive engine mount according to a fifth embodiment of a fluid-filled type vibration damping device constructed in accordance with the present invention.

This engine mount includes a caulking tube portion that does not straddle the annular recessed groove 138 but ends up at the medial section of the annular recessed groove 138 in the width direction (in the mount axial direction). That is, in the present embodiment, only a single positioning projection 130 is provided so as to be adjacent to and axially below the sealing rubber 148.

By the lower end of the caulking tube portion 190 being constricted diametrically inwardly and pushed into the annular recessed groove 138, the caulking tube portion 190 is held in engagement with the axial outer edge portion 134 of the positioning projection 130 so as to form the axial detent part.

As will be appreciated from the above description, the axial positioning portion may be constituted by either one of the axial detent part for limiting dislodgement in the axial direction and the axial insertion stopper part for limiting pushing in the axial direction.

Besides, according to the present embodiment where the axial positioning portion includes the axial detent part only, it is possible to reduce the axial dimension of the caulking tube portion 190 as well as to reduce the thickness dimension of the upper yoke fitting 108 in the axial direction. Therefore, the engine mount of smaller size in the axial direction can be achieved.

Figure 9:
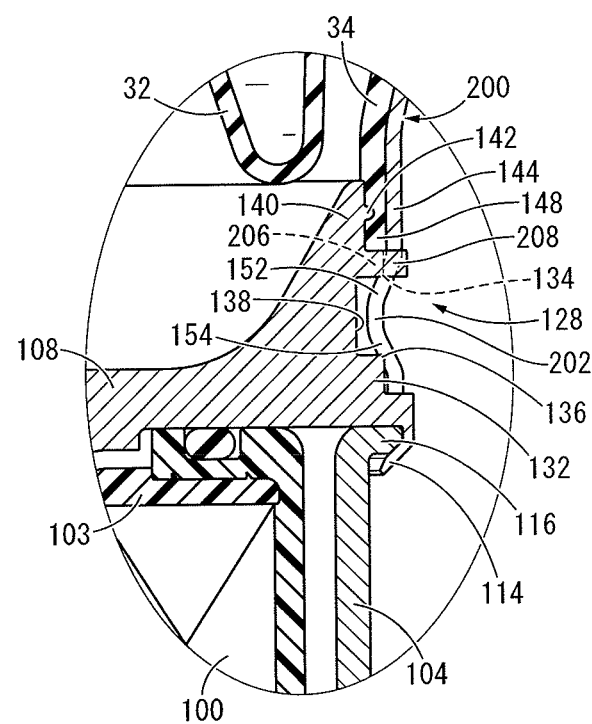
FIG. 9 is a fragmentary enlarged view in axial or vertical cross section of a principle part of an engine mount according to a sixth embodiment of the present invention.

Referring next to FIG. 9, there is depicted a principle part of an automotive engine mount according to a sixth embodiment of a fluid-filled type vibration damping device constructed in accordance with the present invention.

This engine mount has a structure in which a tubular mating component 200 includes a plurality of caulking tube portions 202 that are intermittently provided along its circumference, and the upper yoke fitting 108 includes a plurality of upper positioning projections 206 that are intermittently provided along its circumference at the sections corresponding to the sections where the caulking tube portions 202 are externally fitted. In addition, the upper yoke fitting 108 includes detaining projections 208 that are formed circumferentially among the plurality of upper positioning projections 206 and project peripherally outward. The detaining projection 208 has a projecting height greater than that of the upper positioning projection 206 and has a prescribed circumferential length (the length approximately equal to the distance between the circumferentially adjacent caulking tube portions 202, 202 separated from each other). That is, the upper positioning projections 206 and the detaining projections 208 having different projecting heights in the diametrical direction are alternately provided along the circumference of the upper yoke fitting 108.

The circumferential end face of the caulking tube portions 202 and the circumferential end face of the detaining projections 208 at the section projecting peripherally outward beyond the upper positioning projection 206 come into contact with each other, so that relative rotation of the tubular mating component 200 and the upper yoke fitting 108 will be limited. By so doing, a circumferential positioning portion is provided. It should be appreciated that the detaining projections 208 and the caulking tube portions 202 may not be held in contact in the circumferential direction but may come into contact by means of relative rotation of the tubular mating component 200 and the upper yoke fitting 108, thereby limiting the amount of the relative rotation.

With this arrangement, the circumferential positioning portion is provided by contact between the detaining projections 208 and the caulking tube portions 202, in addition to the diametrical positioning portion provided by contact between the outside peripheral face of the positioning projections 206, 132 and the caulking tube portions 202, as well as the axial positioning portion provided by contact between the axial edge portions 134, 136 of the positioning projections 206, 132 and the caulking tube portions 202. Thus, the tubular mating component 200 and the upper yoke fitting 108 will be more reliably positioned and connected.

While the present invention has been described in detail hereinabove in terms of the preferred embodiments, the invention is not limited by the specific disclosures thereof. For example, whereas the preceding embodiments illustrate structures in which two or single positioning projection is provided, there may be provided three or more positioning projections. By so doing, axial and diametrical positioning action can be more reliably obtained.

Besides, the projecting distal end face of the positioning projections 130, 132 is not necessarily limited to a cylindrical shape, but may alternatively be a tapered slope. This arrangement will prevent positioning deviation of the tubular mating component 36 and the upper yoke fitting 108 during the diameter-constricting process of the caulking tube portion 146, whereby the diameter-constricting process will be easier.

Moreover, the tubular mating component is not limited to a diaphragm outer fitting that is anchored to the outer peripheral edge of the flexible film 32, provided that it constitutes the second mounting member 14 of the fluid-filled type vibration damping device. Also, the base component is not limited to the housing fitting of the electromagnetic actuator 94. That is, the present invention can be applicable not only to a fluid-filled type active vibration damping device, but also to a fluid-filled type vibration damping device without the electromagnetic actuator 94. Besides, in the case where the base component is the housing fitting of the electromagnetic actuator 94, the housing fitting may be provided separately from the yoke fitting 102 and secured to the stator 96.

Additionally, while normally the sealing rubber 148 is integrally formed with the main rubber elastic body 16 or the flexible film 32 so as to reduce the number of parts or manufacturing processes, the sealing rubber 148 may be formed separately from these rubber elastic bodies that constitute the wall of the fluid chamber.

Furthermore, the number of the seal rib 142 provided to the annular sealing portion 140 of the upper yoke fitting 108 is not always limited to one only. Instead, two or more seal ribs 142 may be provided separately in the axial direction, for example. By so doing, sealing performance by the sealing rubber 148 will be more improved.

The present invention is not necessarily limited to implementation in an automotive engine mount, and may be implemented for example in an automotive sub-frame mounts, body mounts, differential mounts or the like. Also, the present invention is applicable to any of vibration damping devices for non-automotive various vibrating bodies such as motorized two wheeled vehicles, rail vehicles, industrial vehicles, or the like.

What is claimed is:

1. A fluid-filled type vibration damping device comprising:
   a first mounting member;
   a second mounting member including a base component and a tubular mating component;
   a main rubber elastic body connecting the first mounting member and the second mounting member;
   a fluid chamber filled with a non-compressible fluid and adapted to receive input of vibration;
   a mate-fastened portion constituted by externally fitting the tubular mating component onto an outer circumferential face of the base component by means of a diameter-constricting caulking with a sealing rubber clasped therebetween;
   a caulking tube portion that is provided at a portion of the tubular mating component extending outward in an axial direction beyond a sealed section of the mate-fastened portion sealed by the sealing rubber; and
   at least one positioning projection provided on the base component at a section where the caulking tube portion is externally fitted,
   wherein a diametrical position of the tubular mating component at the sealed section is determined by contact of the caulking tube portion against an outside peripheral face of the positioning projection so as to define a diametrical positioning portion;
   wherein the caulking tube portion is constricted in diameter and held in engagement with at least one axial edge portion of the positioning projection so as to form an axial positioning portion; and
   wherein the sealing rubber axially extends along an inner surface of the tubular mating component, and wherein the sealing rubber is compressed between the sealed section of the tubular mating component and the base component, and
   an axial end face of the sealing rubber is pressed on an axial upper face of the positioning projection.

2. The fluid-filled type vibration damping device according to claim 1, further comprising:
   an electromagnetic actuator including a stator furnished with a coil supported by the second mounting member, and a movable member capable of relative displacement in the axial direction with respect to the stator; and
   an oscillation member which is connected to the movable member and partially defines a wall of the fluid chamber so that oscillation force of the oscillation member is adapted to be exerted to the fluid chamber,
   wherein the base component comprises a housing fitting provided to the stator of the electromagnetic actuator; and
   wherein the tubular mating component is externally fitted onto the housing fitting by means of the diameter-constricting caulking.

3. The fluid-filled type vibration damping device according to claim 1, wherein the axial edge portion of the positioning projection comprises an axial outer edge portion; and wherein the axial positioning portion of the caulking tube portion includes an axial detent part that is held in engagement with the axial outer edge portion.

4. The fluid-filled type vibration damping device according to claim 1, wherein the axial edge portion of the positioning projection comprises an axial inner edge portion; and wherein the axial positioning portion of the caulking tube portion includes an axial insertion stopper part that is held in engagement with the axial inner edge portion.

5. The fluid-filled type vibration damping device according to claim 1, wherein the at least one positioning projection comprises a plurality of positioning projections formed separately in the axial direction so that the at least one axial edge portion of the positioning projections adjacent to each other comprise axial opposite edge portions; and wherein the axial positioning portion of the caulking tube portion includes an axial detent/axial insertion stopper part that is inserted between the positioning projections and is held in engagement with the axial opposite edge portions.

6. The fluid-filled type vibration damping device according to claim 1, wherein the axial edge portion is of an angular shape having an angle between 90 and 100 degrees.

7. A method of manufacturing a fluid-filled type vibration damping device including: a first mounting member; a second mounting member including a base component and a tubular mating component; a main rubber elastic body connecting the first mounting member and the second mounting member; a fluid chamber filled with a non-compressible fluid and adapted to receive input of vibration; a mate-fastened portion constituted by externally fitting the tubular mating component onto an outer circumferential face of the base component by means of a diameter-constricting caulking with a sealing rubber clasped therebetween; a caulking tube portion that is provided at a portion of the tubular mating component extending outward in an axial direction beyond a sealed section of the mate-fastened portion sealed by the sealing rubber; and at least one positioning projection provided on the base component at a section where the caulking tube portion is externally fitted, wherein a diametrical position of the tubular mating component at the sealed section is determined by contact of the caulking tube portion against an outside peripheral face of the positioning projection so as to define a diametrical positioning portion; and wherein the caulking tube portion is constricted diametrically inwardly beyond the outside peripheral face of the positioning projection so as to form an axial positioning portion that is held in engagement with at least one axial edge portion of the positioning projection, the method comprising:

externally fitting the tubular mating component onto the base component; and subjecting the tubular mating component to a diameter-constricting process at the sealed section sealed by the sealing rubber and the caulking tube portion simultaneously so that the diametrical position of the tubular mating component at the sealed section is determined by contact of the caulking tube portion against the outside peripheral face of the positioning projection so as to define the diametrical positioning portion, wherein during the diameter-constricting process to the tubular mating component, a level of diameter-constricting deformation is made greater in a section of the caulking tube portion situated away from the positioning projection rather than a section of the caulking tube portion externally fitted onto the positioning projection so as to form the axial positioning portion; and wherein the sealing rubber axially extends along an inner surface of the tubular mating component, and wherein the sealing rubber is compressed between the sealed section of the tubular mating component and the base component, and an axial end face of the sealing rubber is pressed on an axial upper face of the positioning projection.

8. The fluid-filled type vibration damping device according to claim 1, wherein an inner surface of the caulking tubular portion that surrounds the annular recess groove is spaced from an axial extending surface of the annular recess groove.

9. The method of manufacturing a fluid-filled type vibration damping device according to claim 7, wherein an inner surface of the caulking tubular portion that surrounds the annular recess groove is spaced from an axial extending surface of the annular recess groove.

\* \* \* \* \*